United States Patent [19]
Blessing

[11] Patent Number: 4,777,714
[45] Date of Patent: Oct. 18, 1988

[54] QUICK-CHANGE MOUNT FOR CHUCKS

[76] Inventor: Hermann Blessing, Hermann-Löns-Strasse 17, 7302 Ostfildern 2 - Nellingen, Fed. Rep. of Germany

[21] Appl. No.: 907,887

[22] Filed: Sep. 16, 1986

[30] Foreign Application Priority Data

Sep. 17, 1985 [DE] Fed. Rep. of Germany ....... 3533060
Nov. 14, 1985 [DE] Fed. Rep. of Germany ....... 3540367

[51] Int. Cl.$^4$ .............................................. B23Q 0/00
[52] U.S. Cl. ..................................... 29/568; 279/1 A
[58] Field of Search ................. 82/30 R, 40 R, 28, 40; 279/1 A, 1 B, 19.6, 19.7, 22, 29, 30, 45, 66, 76, 78, 80; 29/568

[56] References Cited

U.S. PATENT DOCUMENTS 4,107,949 8/1978 Wanner et al. ...................... 279/1 B
4,174,113 11/1979 Eckman ............................... 279/1 B

FOREIGN PATENT DOCUMENTS 3045537 7/1982 Fed. Rep. of Germany .

Primary Examiner—Frederick R. Schmidt
Assistant Examiner—Lawrence Cruz
Attorney, Agent, or Firm—Christel, Bean & Linihan

[57] ABSTRACT

A quick-change mount for chucks is incorporated into a rotatable hollow spindle (10) of a machine tool and comprises servo-actuated drive sleeve (32) for power transmission to clamp the chuck (20) to the spindle flange (12). Slidable within the drive sleeve is a servo-driven clamping sleeve (46) adapted for having fitted thereto the clamping jaw carrier (70) of the chuck. The clamping sleeve includes an annular series of holes (52) for guiding radially movable coupling element (50), which in order to get into coupling condition are displaced partially into a circumferential groove (72) of the clamping jaw carrier by means of a shifting sleeve (58), and in order to bring about the release condition are enabled to leave said groove for an annular recess (60) of the shifting sleeve (58). The shifting sleeve is spring biased into the condition to bring about the coupling position, from which it can be released by means of a catch member (64), when the fixation of the chuck is removed (FIG. 1).

12 Claims, 3 Drawing Sheets

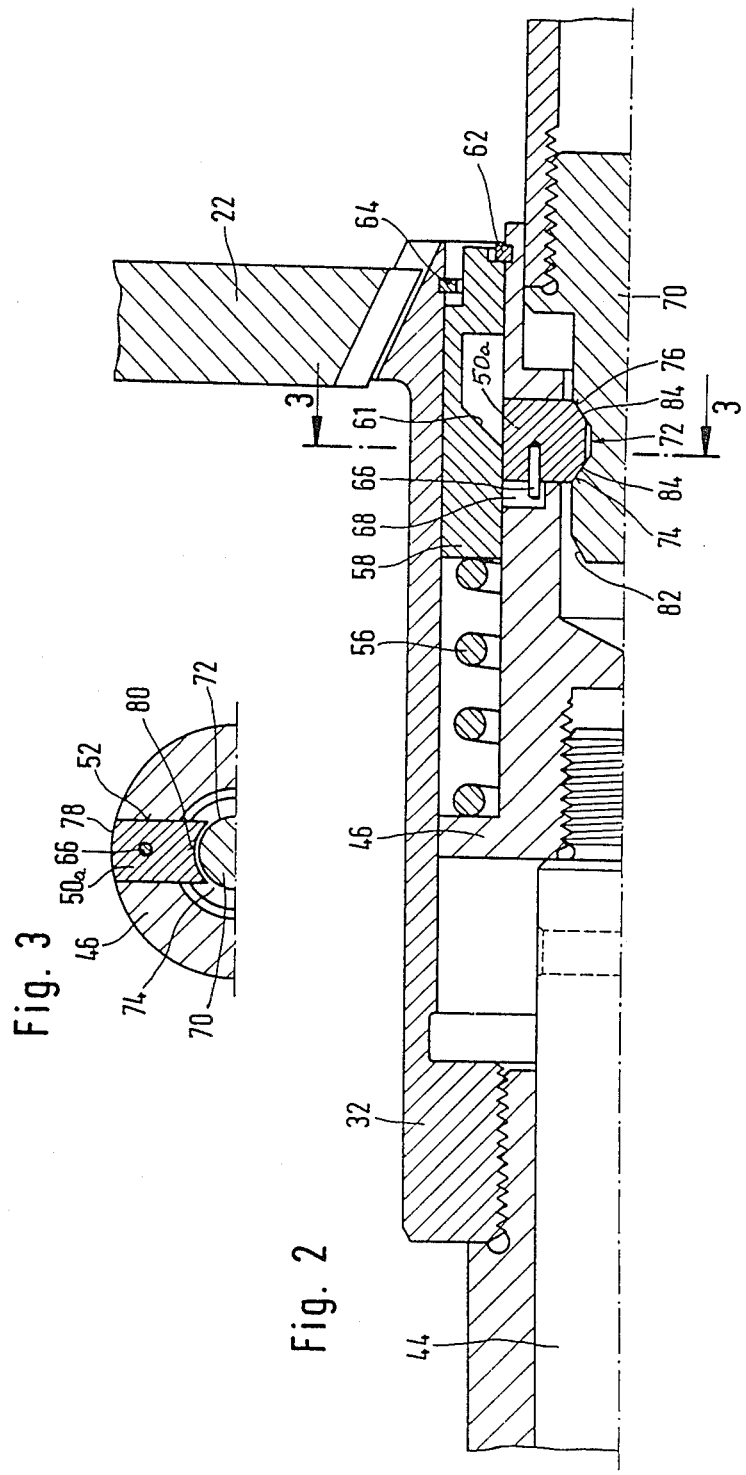

QUICK-CHANGE MOUNT FOR CHUCKS

This invention concerns a quick-change mount for chucks adapted to be secured to a rotatable hollow spindle of a lathe or other machine tool. The mount comprises a driving sleeve adapted to be moved axially within the spindle by means of a first cylinder co-rotating with the spindle. The driving sleeve serves for power transmission to clamp the chuck to the spindle flange, and further a shiftable clamp member is provided for being activated by a second cylinder and for power transmission to the chuck, which then grips a workpiece.

The shiftable clamp member is devised as clamping sleeve for having fitted thereto a clamping jaw carrier and includes an annular arrangement of holes accommodating and guiding radially movable rolling elements, which are of greater diameter than the wall thickness of the sleeve. On one side of the clamping sleeve a shiftable actuating member is provided including a circumferential groove, the open side of which is directed towards the rolling elements. The clamping jaw carrier also includes circumferential groove on that side of the sleeve opposite to the actuating member such that by shifting the actuating member the rolling elements either are projected into the groove of the clamping jaw carrier in order to couple the carrier for axial movement, or the rolling elements will be lodged within a passing space and this enabling to disengage the clamping jaw carrier from the clamping sleeve.

A main objective of this invention is to provide for simplified mounting and locking of a chuck on the machine spindle in order to accelerate the chuck changing operation such that on the same machine different chucks may be mounted and removed easily for clamping and machining (smaller) series of workpieces.

An additional objective is to provide for automatic relationship between operation of the locking device for mounting the chuck and the clamping cylinder for the clamping jaw carrier.

Another additional objective is to reduce the overall wall thickness of the quick-change mounting means—while maintaining the possibility to handle and machine rod stock material—in order to build in the mounting means not only into new machines but also for supplementing and renewing used ones.

According to the invention these objectives are achieved by designing the inner side of the clamping sleeve so as to take up and hold the clamping jaw carrier including pockets open at their outer sides,—further by carrying out the actuating member as shifting sleeve, which is guided on the outer surface of said clamping sleeve and includes a groove on its inner circumference acting as passing space for accomodation of the rolling elements during decoupling and dismounting of the chuck,—and by spring biasing said shifting sleeve against a stop member and by providing a catch member at the driving sleeve for moving said shifting sleeve against the biasing force into a release position, in which said circumferencial groove is opposed to those rolling elements.

Therefore, a special feature of the invention is seen in the simple arrangement and actuation of the shifting sleeve for coupling and decoupling the clamping force transmission with respect for the chuck. The active coupling at the mounting operation of a chuck will be carried out automatically in that the drive sleeve is moved forwardly for actuation of the locking bolts for clamping the chuck. At this operation the expansion spring automatically becomes effective to move the shifting sleeve towards its stop member on the clamping sleeve in order to thereby force the rolling elements through the holes of the clamping sleeve partially into the circumferential groove or into pockets of the clamping jaw carrier and so to accomplish the coupling.

Normally only an axial shifting force will be transmitted by means of the clamping sleeve to the clamping jaw carrier in order to enable the rolling elements, e.g. balls or rolls, to accomplish the coupling engagement with the circumferential groove of the clamping jaw carrier. On the other side, pockets disposed in the other surface of the clamping jaw carrier, each for one or a plurality of rolling elements, serve to simultaneously transmit rotating movements between the shifting sleeve and the clamping jaw carrier.

Further, it may be advantageous, if the novel quick-change of this invention does not include hydraulic parts in the area of the chuck or spindle and consequently no warming up will take place there, which otherwise is usually effected by the hydraulic fluid such as giving a rise to inaccuracies in preciston of the spindle and its bearings. As another feature of security the stroke of the piston rods or of the sleeves may be monitored for controlling the path of clamping operation.

According to another aspect of the invention the quick-change mounting means may comprise an adapting member covering the normally provided flange of the spindle in order to enlarge this flange as necessary to adapt another or standardized chuck to the quick-change mounting system. There are no difficulties to carry out when a chuck shall be detached from the spindle, clamping to the chuck is released by pulling the drive sleeve towards the inner end of the hollow spindle. By this inward movement the catch member secured to the drive sleeve entrains the shifting sleeve rearwardly against the force of its biasing spring such that the circumferential groove will become positioned opposite to the rolling elements to thereby finish the coupling engagement of the clamping jaw carrier out of the clamping sleeve the rolling elements will be partially displaced radially outwardly into the shifting sleeve.

Therefore, a special feature of the invention is seen in the simple arrangement and actuation of the shifting sleeve for coupling and decoupling the clamping force transmission with respect for the chuck. The active coupling at the mounting operation of a chuck will be carried out automatically in that the drive sleeve is moved forwardly for actuation of the locking bolts for clamping the chuck. At this operation the expansion spring automatically becomes effective to move the shifting sleeve towards its stop member on the clamping sleeve in order to thereby force the rolling elements through the holes of the clamping sleeve partially into the circumferential groove or into pockets of the clamping jaw carrier and so to accomplish the coupling.

Normally only an axial shifting force will be transmitted by the inventional mounting system in rugged manner and without being susceptible to getting penetrated by dirt or dust.

The background concept of this system is to provide for of a more frequent and easy change of chucks, in contrast to maintaining mounted the chuck and only to change its jaws, which leads to difficulties in view of pollution, metal chips etc. and cannot be carried out automatically. By using the inventional quick-change mounting means smaller series of work pieces can be machined one after the other with different chucks on the same machine, which may can be well programmed in advance such that with the use of suitable machine tools shifts can be organized without human attendance.

Additional advantages and aspects of the invention will become apparent from the claims, the following description of an embodiment, and also from the drawings. Each single feature, particularly those of the claims, may incorporate by themselves or in any other combination, additional embodiments of the invention.

FIG. 2 is an enlarged partial sectional view of the coupling area of the quick change mount of this invention, this view illustrating a second embodiment.

FIG. 3 is a partial sectional view taken along lines 3—3 in FIG. 2.

Figure 1:
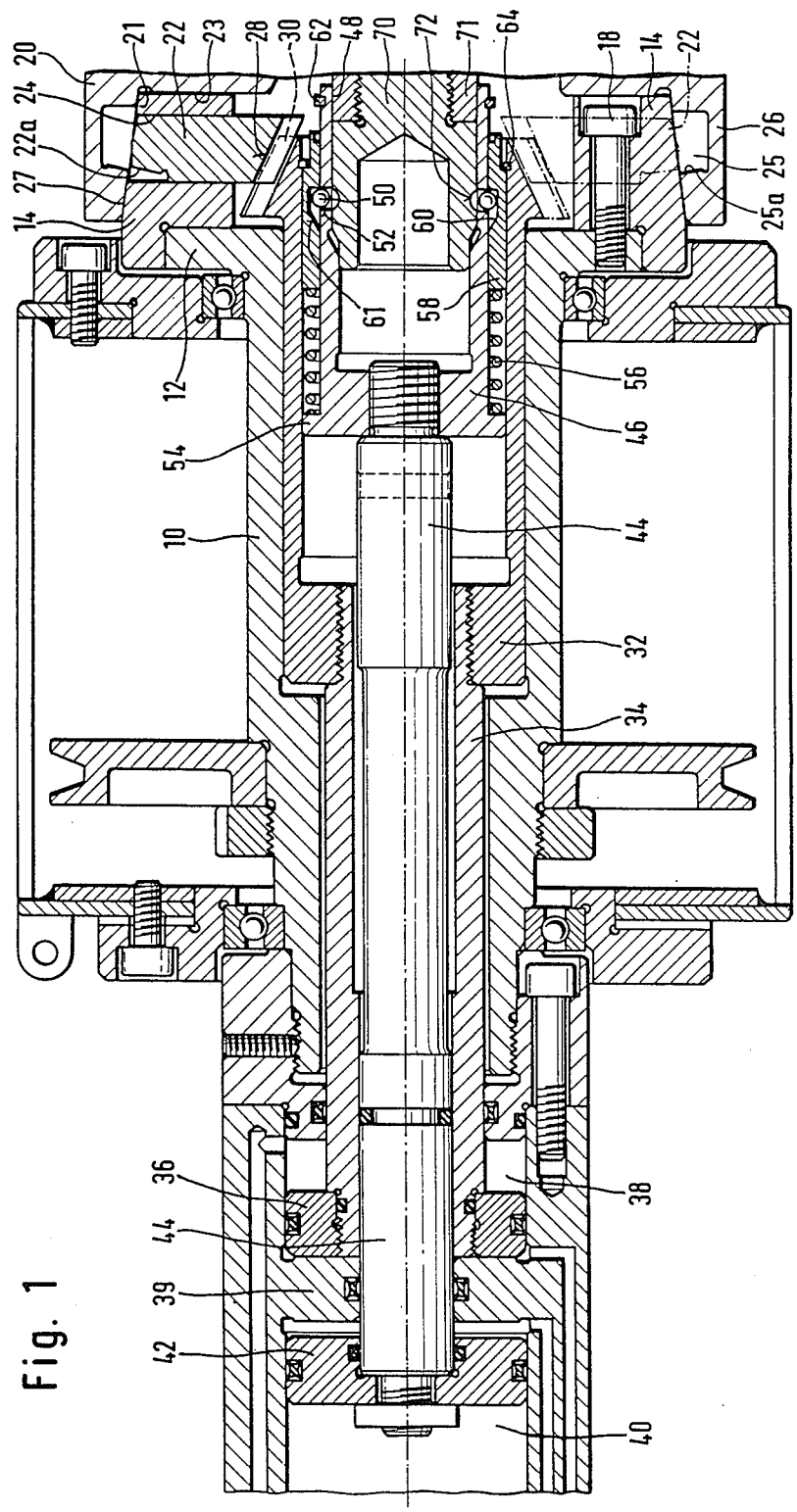
FIG. 1 shows the quick change mount of this invention in combination with a rotatable hollow spindle of a lathe or other machine tool and a shiftable rod disposed within the hollow spindle, the quick change mount having received thereon a chuck including a bell-shaped portion and a cylindrical portion, the chuck being disposed in an uncoupled position.
Figure 1A:
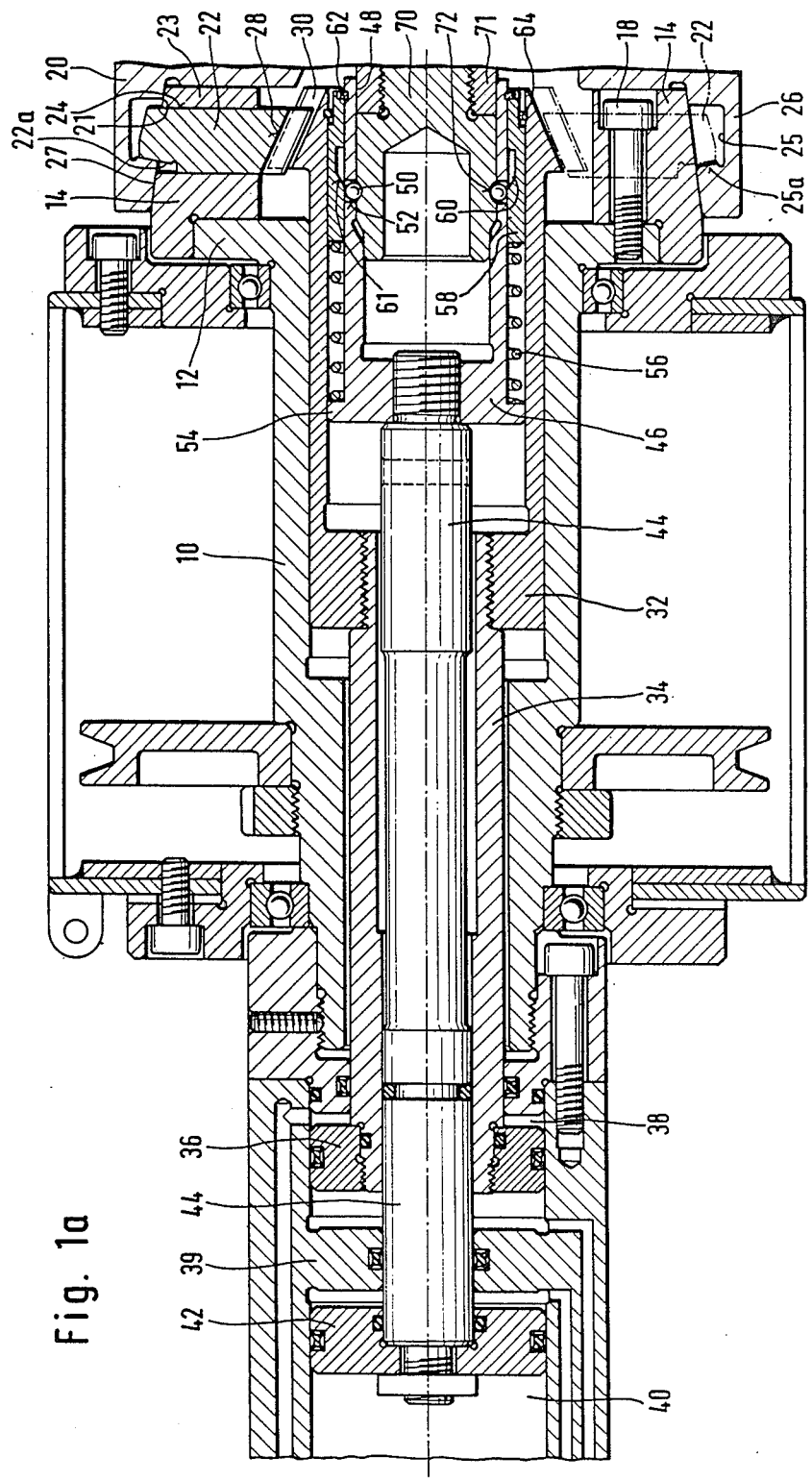
FIG. 1a is a view similar to FIG. 1 but showing the chuck fully coupled so that rotational movement of the spindle can be imparted to the bell-shaped portion of the chuck and axial movement of the shiftable rod can be imparted to the cylindrical portion of the chuck.

Referring first to FIGS. 1 and 1a, the quick change mount of this invention is adapted to couple a bell-shaped portion 20 of a chuck to a hollow spindle of a lathe or the like, the quick change mount also coupling an axially shiftable rod 44 disposed within the hollow spindle 10 to an axially shiftable portion 70 of the chuck. The machine spindle 10 is provided with an end flange 12. An adapter member 14 is secured to the end flange 12 by means of bolts 18 in order to enlarge the mounting face of the spindle 10. The bell-shaped portion of the chuck 20 includes a centering sleeve portion 26 which is initially positioned against a conical outer surface 27 of the adapting member 14 as can best be seen from FIG. 1. The centering sleeve portion 26 of the chuck includes an inner circumferential groove 25 which can receive the radial outer ends of radially guided locking members 22, which ends are provided with slanted end portions 22a which engage the inclined side wall 25a of the groove when in their coupling position (FIG. 1a). There are several locking members 22, for example three, which are regularly spaced about the circumference of the adapting member 14 and are guided in radially extending passages 24. The inner end of each of the locking members 22 includes a dovetail groove 28 or a similar sliding guideway, which groove or guideway is engaged by guide ribs or projections 30 of a drive sleeve 32, which drive sleeve is mounted within the spindle 10 for axial shifting movement. Thus, the sleeve 32 is provided with a guide rib for each of the locking members 22. If three locking members are utilized, these locking members will typically be spaced 120° from each other, and thus, the guide ribs will also be spaced 120° apart.

The drive sleeve 32 is screwed onto a cylindrical hollow piston rod 34 which extends about the piston rod 44, the rear end of piston rod 34 being connected to an annular piston 36 which is disposed within a cylinder 38. In FIG. 1 the piston 36 is shown in its rear and/or unclamping position in which the drive sleeve 32 maintains the locking members 22 in their radially inward position by the cooperation of the guide ribs 30 within the dovetail grooves 28. The piston rod 44 is secured at its rear end to a piston 42 which is disposed within a rear clamping cylinder 40. The piston rod 44 extends through an opening within partition wall 39 between cylinders 38 and 40 and also extends through the hollow piston rod 34 and annular piston 36.

A clamping sleeve 46 is rigidly secured to the forward end (to the right in FIGS. 1 and 1a) of the piston rod 44, as for example by a threaded connection. The clamping cylinder 40 and the clamping sleeve 46 serve to transmit a clamping force to radially moveable clamping jaws (not shown) which are mounted on the chuck for clamping a workpiece to the chuck. A particular feature of the present invention consists in the manner of coupling the clamping sleeve 46 to the cylindrical axially shiftable portion 70 of the chuck so that by axial movement of the piston rod 44 the radially movable clamping jaws on the chuck will be moved between their clamping and unclamping positions. The cylindrical axial shiftable portion 70 of the chuck receives a sleeve portion 71 which together, along with other parts not shown, form a clamping jaw carrier assembly within the chuck. The cylindrical axially shiftable portion 70 and sleeve portion 71 of the clamping jaw carrier assembly have a common outer cylindrical surface which is slideably guided within the inner surface 48 of clamping sleeve 46. It can be seen that the left hand end (FIG. 1) of the cylindrical axially shiftable portion is provided with a reduced diameter surface which facilitates its entry into the clamping sleeve 46 when the chuck is pushed onto the quick change mount of this invention.

The outer or right end portion of clamping sleeve 46 has a reduced wall thickness with respect to its base portion and includes a circular arrangement of holes 52, each hole serving to radially guide a coupling element 50 which in the embodiment of FIGS. 1 and 1a are balls. When the clamping sleeve 46 is coupled to the cylindrical axially shiftable portion 70 the balls will extend into a circumferential outer groove 72 of the portion 70 and are maintained and locked in their coupling position by the inner surface of a shiftable sleeve 58 as can best be seen in FIG. 1a.

The shiftable sleeve 58 is disposed between the inner cylindrical surface of drive sleeve 32 and the outer cylindrical surface of clamping sleeve 46 and is biased by spring means in the form of a compression spring 56 against a stop member. When the parts are in their coupling position, shown in FIG. 1a, the shiftable coupling sleeve 58 is biased against a first stop member 62 which may be in the form of a snap ring on the clamping sleeve 46. When the parts are in their uncoupled position, shown in FIG. 1, the shiftable coupling sleeve 58 is biased against a second stop member 64 which may be a snap ring carried by the inner cylindrical surface of the drive sleeve 32. One end of the compression spring 56 bears against a shoulder 54 of the clamping sleeve 46, the shoulder 54 having an outer diameter just slightly less than the inner diameter of the drive sleeve 32.

The shifting sleeve 58 includes an internal groove 60 which is large enough to accommodate the balls 50 in their release or uncoupled position shown in FIG. 1, wherein these elements are released from their coupling function and may be displaced radially outwardly. The force of the spring 56 is sufficient to cause the balls 50 to be forced radially inwardly as the parts shift from the FIG. 1 position to the FIG. 1a position, thereby displacing the balls into the external groove 72 on the cylindrical portion 70 of the chuck. In order to facilitate this radially inwardly displacement, the groove 60 which receives a portion of the balls 50 when in their uncoupled position, as shown in FIG. 1, is provided with a slanted surface 61 as a rear side wall.

In operation, when a chuck is to be mounted to a lathe spindle 10, it is initially positioned on the quick change mount of this invention, as shown in FIG. 1, with its inner conical surface 21 on the conical outer surface 27 of adapter 14 and with the cylindrical axially shiftable portion 70 being disposed within the clamping sleeve 46, also as shown in FIG. 1. Then, if fluid is introduced into the cylinder 38 to the left hand side of piston 36, the piston 36 together with its drive sleeve 32 will move to the right to the FIG. 1a position. As the piston 36 and drive sleeve 32 move to the right, the locking members 22 will be forced radially outwardly so that their slanting surface 22a engage the slanted side wall 25a of inner groove 25 in order to thereby move the bell-shaped portion 20 of the chuck to the left to cause it to tightly engage the conical surface 27 for driving engagement therewith. At the time when the bell-shaped portion 20 of the chuck is locked to the adapter 14 as shown in FIG. 1a, the outer circumferential groove 72 on the portion 70 of the chuck is in axial alignment with the circular arrangement of holes 52 and coupling elements 50, and the latter are automatically and simultaneously forced inwardly by action of spring 56 which urges the shifting sleeve 58 to the right hand (FIG. 1a) position as soon as the drive sleeve 32 has carried out its locking movement to the right. Therefore, as long as drive sleeve 32 is in the position as shown in FIG. 1a, the bell-shaped portion of the chuck will be locked to the adapter 14, and, as the spring 56 maintains the shifting sleeve 58 in its right hand position where it abuts the first stop member 62, the clamping sleeve 46 will be locked to the cylindrical portion 70 for axial shifting movement therewith. The piston 42 can now be shifted to suitably position the radially moveable clamping jaws (not shown) on the chuck for clamping and unclamping a workpiece.

When the chuck is to be disassembled from the spindle 10, the piston rod 44 will initially be moved to that position where the radially moveable clamping jaws (not shown) of the chuck are disposed in an unclamping position. Now the chuck is unclamped by shifting the drive sleeve 32 towards the inner end of the hollow spindle 10, this being accomplished by causing the piston 36 to be shifted to the left from its FIG. 1a position to its FIG. 1 position. By this inward movement, the stop member 64, which is secured to the drive sleeve 32, will engage the shiftable coupling sleeve 58 and cause it to be moved rearwardly against the force of the spring 56 so that the circumferential groove 60 will become positioned opposite to the coupling elements 50 to thereby permit the portion 70 of the chuck to become uncoupled. At the same time as the piston 36 and drive sleeve 32 are shifted from the FIG. 1a position to the FIG. 1 position, the locking members 22 will be shifted radially inwardly, thereby permitting the portion 20 of the chuck to be removed from the adapter member 14. When the chuck is removed by pulling it to the right the coupling element 50 will be partially displaced radially outwardly into the shifting sleeve.

FIGS. 2 and 3 show another embodiment of the coupling area between the cylindrical axially shiftable portion 70 of the chuck and the clamping sleeve 46. In FIG. 2 coupling elements 50a are illustrated, these coupling elements having a circular, rectangular, or square cross-section when horizontally cut in a plane which is perpendicular to the plane of FIG. 2. These coupling elements 50a are slideably accommodated in radially extending openings or holes 52 of the clamping sleeve 46. At least three or more coupling elements 50a are circumferentially disposed about the circumference of the clamping sleeve 46, and each of them has a convex outer side 78 which may correspond to the circumferential curvature of the clamping sleeve 46 and also may be beveled opposite to slanting side wall 61 of circumferential groove 60 on the shiftable coupling sleeve 58. A concave inner side 80 of the coupling elements 50a may substantially conform to the curvature of groove 72 of the shiftable portion 70, as shown in FIG. 3.

The rear end of portion 70 has a rear bevel 82 which may be at the same angle as slanted side walls 74 and 76 of its circumferential groove 72. Two opposite bevels 84, averted from each other, are provided on the inner sides of the coupling element 50a as shown in FIG. 2, which bevels provide for a complete coupling engagement and a large surface for axial power transmission when the parts are in their FIG. 2 position and piston 42 is operated to cause actuation of the radially moveable clamping jaws of the chuck. Thus, FIG. 2 shows the condition when the chuck is secured to the machine spindle and the shiftable portion 70 is fixedly coupled to the clamping sleeve 46 for transmitting thrust and traction forces.

If for ease of manufacture of holes 52, the coupling element 50a as in FIGS. 2 and 3 have bodies of circular cross-section (when viewed radially), each coupling element may have a projection or pin 66 which is guided in a radially extending slot or groove 68 of the clamping sleeve 46. This avoids any rotation of the cylindrical coupling element 50a and keeps them from moving inwardly through the clamping sleeve 46, when the chuck is removed from the spindle.

As an alternative embodiment the circumferential groove 72 may be provided with vertical side walls or with one slanted side wall in order to be able to transmit larger forces. Then, the inner sides of the coupling elements may have straight sides or vertical shoulders. In designing this area it is of basic importance to reduce the pressure per unit of area as far as possible.

Instead of the lateral projections 66, spring means (not shown) may be provided, which spring means will keep the coupling elements 50a connected to the clamping sleeve 46, and which, in a specific variant, act to bias the coupling elements radially outwardly into their release position. Such outwardly directed biasing force will not be necessary, when the pin portion of end member 70 at least has a rear bevel 82 and the bevel surface 74, as shown in FIG. 2, acting as wedges to outwardly displace the coupling elements.

What is claimed is:

1. A quick change mount in combination with a rotatable hollow spindle (10) of a lathe or other machine tool, the mount being capable of coupling a chuck to the spindle, the chuck having a cylindrical axially shiftable portion (70) which is provided with an outer circumferential groove; said quick change mount comprising:
   an axially shiftable drive sleeve (32) mounted within the rotatable hollow spindle (10);
   an axially shiftable clamping sleeve (46) mounted within the drive sleeve (32) and adapted to be coupled to the cylindrical axially shiftable portion (70)

of the chuck for transmission of axial shifting movement thereto, said clamping sleeve including an annular arrangement of holes (52) and a first stop member (62);

radially moveable coupling elements (50) of a radial dimension greater than the wall thickness of said clamping sleeve, said coupling elements being disposed at least in part in said holes;

an axially shiftable coupling sleeve (58) mounted on the outer surface of the clamping sleeve and within the drive sleeve and including an internal circumferential groove (60), the open side of which is directed toward said coupling elements (50);

spring means (56) normally biasing said shiftable sleeve (58) axially towards said first stop member; and a second stop member (64) on the drive sleeve; the parts being so arranged and constructed that when the chuck is initially mounted on the quick change mount the axially shiftable portion of the chuck can be coupled to the clamping sleeve for movement therewith by shifting the drive sleeve (32) in a direction towards said first stop means whereby said spring will cause the shiftable coupling sleeve to shift with said drive sleeve until the shiftable coupling sleeve abuts the first stop means, said movement of the shiftable sleeve causing the coupling elements (50) to be shifted into the outer circumferential groove on the axially shiftable portion of the chuck to couple the chuck to the shiftable clamping sleeve (46).

2. The quick change mount as set forth in claim 1 further characterized by the provision of an adapter member (14) mounted on said spindle, said adapter member carrying radially guided locking members (22) which in their extended position engage a bell-shaped portion (20) of the chuck.

3. The quick change mount as set forth in claim 1 wherein the clamping sleeve (46) is provided with a shoulder (54) guided within the drive sleeve (32), one end of the spring means (56) bearing against the shoulder (54) and the other end of the spring means (56) bearing against one end of the shiftable coupling sleeve (58).

4. The quick change mount as set forth in claim 1 wherein the internal circumferential groove (60) is provided with a slanted surface (61) as a rear side wall.

5. The quick change mount as set forth in claim 1 wherein the second stop member (64) is axially offset with respect to the first stop member (62).

6. The quick change mount as set forth in claim 1 wherein the axially shiftable drive sleeve (32) is interconnected with a piston (36) for reciprocal movement therewith.

7. The quick change mount as set forth in claim 1 wherein the radially moveable coupling elements (50) have a circular cross section, and further characterized by the provision pin means (66) carried by said coupling elements, said pin means being received within slots (68) of the clamping sleeve (46) to prevent the radially moveable coupling elements from leaving the holes (52) by radially inward movement.

8. A quick change mount in combination with a rotatable hollow spindle (10) of a lathe or other machine tool and a shiftable rod (44) disposed within the hollow spindle, the quick change mount being capable of coupling a first bell-shaped portion (20) of the chuck to the spindle for rotation therewith and also being capable of coupling a second axially shiftable portion (70) of the chuck to the shiftable rod (44) for axial shifting movement therewith; said quick change mount comprising:

an axially shiftable drive sleeve (32) mounted within the spindle (10) about the axially shiftable rod (44) for axial movement between coupling and uncoupling positions;

an adapter member (14) secured to said spindle (10) for rotation therewith;

first coupling means (22, 28, 30) extending between the drive sleeve and the first portion of the chuck for coupling the first portion (20) of the chuck to the adapter member (14) for rotation therewith when the shiftable drive sleeve (32) is shifted to its coupling position; and second coupling means (46, 50, 56, 58) extending between the drive sleeve and the axially shiftable portion of the chuck for simultaneously coupling the axially shiftable portion (70) of the chuck to the shiftable rod (44) for axial shifting movement therewith when the shiftable drive sleeve is shifted to its coupling position.

9. The quick change mount as set forth in claim 8 wherein the first coupling means includes radially guided locking members (22) carried by said adapter member (14), the inner end of each of the radially guided locking members being provided with a dovetail groove disposed at an angle to the axis of the shiftable drive sleeve, the first coupling means additionally including guide ribs (30) carried on the drive sleeve at an angle to the axis of the drive sleeve, the angles being such that as the axially shiftable drive sleeve is moved from its uncoupling position to its coupling position the radially guided locking members will be projected radially outwardly to secure the first portion of the chuck to the adapter member.

10. The quick change mount as set forth in claim 8 wherein the axially shiftable portion (70) of the chuck includes a cylindrical portion provided with an external circumferential groove, and wherein the second coupling means includes an axially shiftable clamping sleeve (46) secured to the shiftable rod (44) for movement therewith, the clamping sleeve (46) including an annular arrangement of holes (52), radially moveable coupling elements (50) of a radial dimension greater than the wall thickness of the clamping sleeve, there being one coupling element (50) associated with each of the holes (52), and an axially shiftable coupling sleeve (58) mounted about the axially shiftable clamping sleeve (46), said axially shiftable coupling sleeve (58) including an internal circumferential groove (60), the parts being so arranged that when the circumferential groove (60) is in radial alignment with the holes (52) the axially shiftable portion (70) of the chuck may be disconnected from the axially shiftable clamping sleeve.

11. The quick change mount as set forth in claim 10 wherein the second coupling means further includes spring means (56) disposed about the clamping sleeve, one end of the spring means bearing against a radially outwardly extending shoulder (54) of the clamping sleeve (46), and the other end of the spring bearing against one end of the coupling sleeve (58), the second coupling means additionally including first and second stop members (62, 64), one of said stop members (62) being mounted upon the outer surface of the clamping sleeve (46) and the other stop member (64) being carried by an inner surface of the drive sleeve (32), the parts being so arranged and constructed that when the drive sleeve (32) is in its uncoupling position the spring means (56) will cause the coupling sleeve to bear against the second stop member (64) and when it is in its coupling position the spring means (56) will cause the coupling sleeve (58) to bear against the first stop member (62).

12. A quick change mount for coupling a chuck to a lathe spindle or the like, the chuck having a cylindrical portion (70), the spindle having a hollow portion (10) and also having mounted therein a clamping sleeve (46) and an axially shiftable portion (32) disposed about the clamping sleeve:

the improvement comprising coupling means (50) capable of coupling the cylindrical portion (70) to the clamping sleeve (46) when in a coupling position and not coupling the cylindrical portion (70) to the clamping sleeve (46) when in a second position;

actuator means (58) in the form of a shiftable sleeve disposed about the clamping sleeve (46) and shiftable relative thereto to cause the coupling means (50) to be in the coupling position when the actuator means (58) is in a clamping position and the coupling means (50) to be in the second position when the actuator means (58) is in an unclamping position;

spring means (56) normally biasing the actuator means (58) to the clamping position; and stop means (64) capable of causing the actuator means (58) to be shifted to the unclamping position when the axially shiftable portion (32) is moved axially in a direction away from the cylindrical portion (70) to thereby permit uncoupling of the cylindrical portion (70) from clamping sleeve (46).

* * * * *